(12) United States Patent
Knox et al.

(10) Patent No.: US 7,024,111 B2
(45) Date of Patent: Apr. 4, 2006

(54) DYNAMIC MEASUREMENT OF AND COMPENSATION FOR IMPAIRMENTS TO OPTICAL DATA COMMUNICATION PULSES USING PHOTON-COUNTING SILICON AVALANCHE PHOTODIODE

(75) Inventors: Wayne Harvey Knox, Pittsford, NY (US); Jeffrey M. Roth, Hudson, MA (US); Chunhui Xu, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 139 days.

(21) Appl. No.: 10/099,180

(22) Filed: Mar. 16, 2002

(65) Prior Publication Data
US 2004/0151495 A1 Aug. 5, 2004

Related U.S. Application Data (60) Provisional application No. 60/281,661, filed on Apr. 5, 2001.

(51) Int. Cl.
*H04B 10/08* (2006.01)

(52) U.S. Cl. .............. 398/25; 398/26; 398/27; 398/28; 398/29; 398/202; 398/212; 398/208

(58) Field of Classification Search ............ 398/24–30, 398/202–214
See application file for complete search history.

(56) References Cited

U.S. PATENT DOCUMENTS

2002/0156592 A1 * 10/2002 Taira et al. .............. 702/66

OTHER PUBLICATIONS

K. Kikuchi, F. Futami and K. Katah. Highly sensitive and compact cross-correlator for measurement of picosecond pulse transmission characteristics at 1550nm using two-photon absorption in Si avalanche photodiode. Electronics Letters. vol. 34, No. 22.*

K. Kikuchi; Highly sensitive interferometics autocorrelator using Si avalanche photodiode as two-photon absorber; Jan. 8, 1998; *Electronics Letters*, vol. 34, No. 1.

K. Kitkuchi; Optical sampling system at 1.5μm using two photon absorption in Si avalanche; Jun. 25, 1998; *Electronics Letters*, vol. 34, No. 13.

S. Cova et al; Avalanche photodiodes and quenching circuits for single-photon detection; Apr. 20, 1996; *Applied Optics*, vol. 35, No. 12.

* cited by examiner

*Primary Examiner*—M. R. Sedighian
*Assistant Examiner*—David Lee

(57) ABSTRACT

Apparatus and method is described for using a silicon photon-counting avalanche photodiode (APD) to detect at least two-photon absorption (TPA) of an optical signal, the optical signal having a wavelength range extending from 1.2 μm to an upper wavelength region that increases as the number of photons simultaneously absorbed by the APD increases beyond two. In one embodiment, the TPA count is used by a signal compensation apparatus to reduce dispersion of a received optical pulse communication signal subjected to group velocity dispersion, polarization mode dispersion, or other signal impairment phenomena which effect the TPA count. Another embodiment, the TPA count is used to determine the optical signal-to-noise ratio of a received optical pulse communication signal. Another embodiment uses the TPA count to determine the autocorrelation between a first and second optical pulse signals as a function of the relative delay between the first and second optical pulse signals. Another embodiment uses the TPA count to achieve synchronization of a second optical pulse signal to a first optical pulse signal.

11 Claims, 8 Drawing Sheets

DYNAMIC MEASUREMENT OF AND COMPENSATION FOR IMPAIRMENTS TO OPTICAL DATA COMMUNICATION PULSES USING PHOTON-COUNTING SILICON AVALANCHE PHOTODIODE

RELATED APPLICATION

This application is based on a provisional application Ser. No. 60/281,661 filed on Apr. 5, 2001 and entitled "Ultrasensitive autocorrelation of 1.5 µm light with a photon-counting silicon APD."

TECHNICAL FIELD OF THE INVENTION

This invention relates to the measurement and compensation of distortion to optical data pulses, and more particularly to the dynamic measurement and real-time compensation of distortion to optical data pulses using photon-counting silicon avalanche photodiode.

BACKGROUND OF THE INVENTION

Optical communications Systems at 10 Gb/s, 40 Gb/s and emerging higher bit-rates have stringent requirements on the characteristics of the optical pulses. Impairments to the pulsestream caused by group velocity dispersion (GVD), polarization mode dispersion (PMD), and other undesired effects can severely degrade these systems. The ability to affordably and dynamically measure these time-varying impairments, either for monitoring or compensating purposes, adds attractive functionality to a transmission network. The need for these techniques exists both at the receiver and at individual repeater locations throughout the network.

SUMMARY OF THE INVENTION

The present invention describes the use of a silicon photon-counting avalanche photodiode (APD) as a two-photon detector in the wavelength region of 1.2–2.0 µm and an apparatus and method for determining optical pulse communication signal characteristics using the rate at which two-photon absorption (TPA) of the communication signal is detected by the APD. More generally, our technique may be applied to the detection of more than two-photons by the APD and hence the upper region of the wavelength range extends beyond 2.0 µm.

According to one embodiment of our invention, a TPA count is utilized by a signal compensation apparatus for real-time compensation of a received optical pulse communication signal subjected to group velocity dispersion, polarization mode dispersion, or other signal impairment phenomena which effect the two-photon absorption (TPA) response.

According to another embodiment of our invention, apparatus is disclosed for using the TPA count to determine the optical signal-to-noise ratio (OSNR) of a received optical pulse communication signal.

According to yet another embodiment, the TPA count is used for determining the autocorrelation between a first and second optical pulse signals as a function of the relative delay between the first and second optical pulse signals.

Another inventive embodiment uses the TPA count to synchronize a second optical pulse signal to a first optical pulse signal.

More particularly, our inventive method describes a technique for determining a characteristic of an input optical signal, comprising the steps of:
Receiving the optical signal and
applying the optical signal to a silicon photon-counting avalanche photodiode, APD, and detecting at least two-photon absorption, TPA, the optical signal having a wavelength range extending from 1.2 µm to a upper wavelength region that increases as the number of photons simultaneously absorbed by the APD increases beyond two.

More particularly, in accordance with a broad aspect of the invention, we describe apparatus for detecting characteristics of an input optical signal comprising
a photon-counting avalanche Photo Diode, APD, for detecting at least two-photon absorption, TPA, of the optical signal, the optical signal having a wavelength range extending from 1.2 µm to a upper wavelength region that increases as the number of photons simultaneously absorbed by the APD increases beyond two,
apparatus capable of quantifying the TPA response, and
means for determining a characteristic of the optical signal using the detected TPA response.

DETAILED DESCRIPTION

Figure 1:
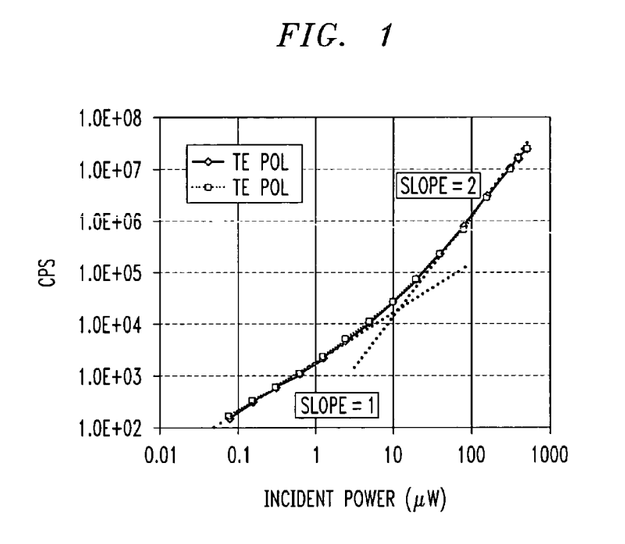
FIG. 1 shows a graph which illustrates the low level of signal power needed for two-photon absorption (TPA) with a photon counting silicon avalanche photodiode (APD).

The present invention describes the work done by the inventors in measuring two-photon absorption (TPA) at record-low power in the 1.5 µm region using a photon-counting silicon avalanche photodiode (APD). This technique is described in the above-identified provisional application and in our subsequently published article [1]. (Note numbers in brackets refer to references listed in the Appendix) The low signal power requirement for achieving TPA with a photon-counting silicon APD, as shown in FIG. 1, is due to the high avalanche gain (~$10^6$) of the APD and ultra-low background noise (typically less than few hundred counts per second). FIG. 1 shows single photon absorption (slope=1) and two-photon absorption (TPA, slope=2) responses of an APD (in counts per second-CPS) at different incident power levels of a 1.58 μm continuous wave, CW, laser. Note, at laser power levels below about 10 μW, the slope in the log—log plot slope becomes about 1.0 (slope=1) indicating that one-photon absorption contribution dominates. At power levels above about 20 μW, the slope in the log—log plot slope becomes about 2.0 (slope=2) indicating that two-photon absorption (TPA) contribution dominates and one-photon contribution is negligible. The response illustrated in FIG. 1 also shows low Polarization (TE, TM) sensitivity of the APD between 0.0 and 0.8 dB. In later paragraphs, we describe the ability to do highly sensitive autocorrelation measurements of laser pulses with this APD [1].

Measurement of Impairments Affecting Pulsewidth

Because the TPA count is inversely proportional to pulsewidth, as shown in the equation below, we have recognized that TPA is an attractive candidate for implementing dynamic measurement and compensation of impairments affecting pulsewidth. This expression for the number of two-photon absorption events, $H_{TPA}$, (is shown below, in terms of average power (P), pulsewidth ($T_0$), average pulse repetition rate ($T_R$) and the conversion efficiency η.

$$H_{TPA} = \eta \, T_R/T_O$$

The low power requirement for achieving TPA with the photon-counting silicon APD as shown in FIG. 1 means that only a small amount of power is needed to characterize the pulsewidth at any point in the optical link. Furthermore, TPA can be achieved in a simple direct-detection configuration involving no polarization dependent phase matching or expensive nonlinear crystals. Our APD device is also very compact, can be directly fiber-coupled and requires only a DC power supply.

Figure 2A:
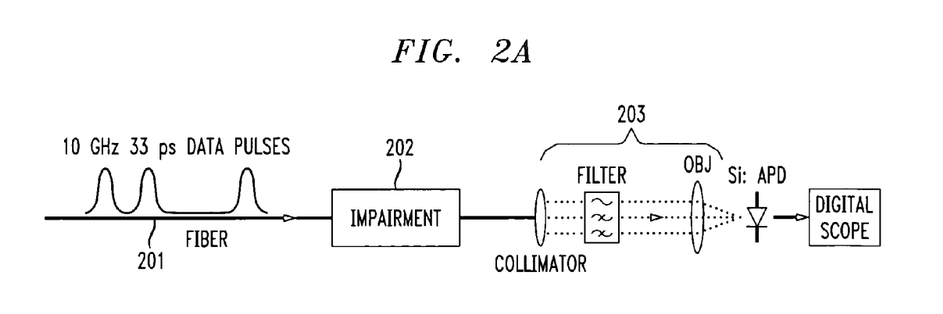
FIG. 2A shows APD apparatus for the measurement of data pulse impairment.

With reference to FIG. 2A, we illustrate the use of APD to detect changes in pulse quality in a 10 Gb/s, 33 ps, return-to-zero data pulsetrain. Note that wavelength range of the optical pulse communication signal is in the range of 1.2–2.0 μm, so that the avalanche photodiode operates in a regime where two-photon absorption occurs.

Figure 2B:
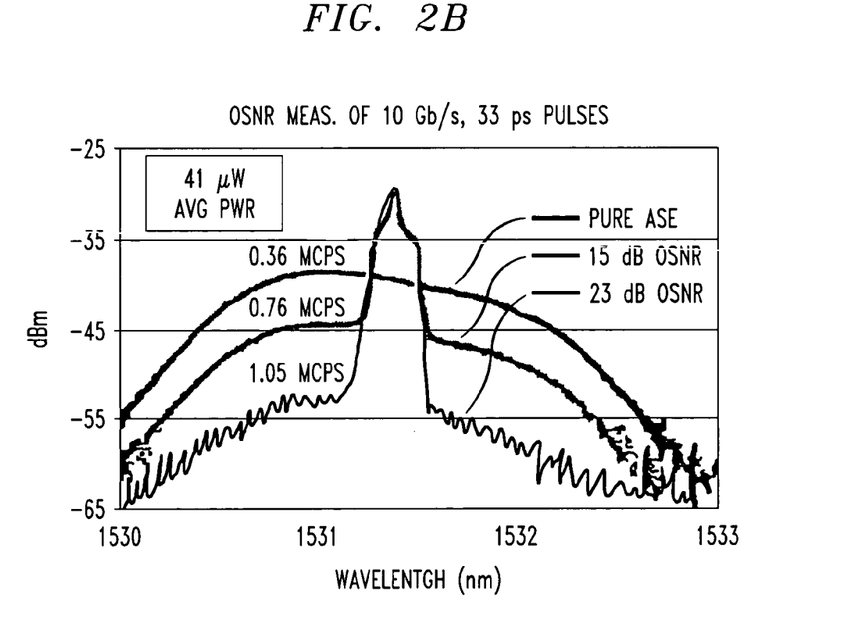
FIG. 2B shows the variation in TPA count rates for data pulses having different optical signal-to-noise ratios (OSNR).

The apparatus of FIG. 2A utilizes an inline, direct-detection configuration to detect TPA of an optical pulse communication signal. In the setup, the optical pulse communication signal is received over fiber 201 and passes through a signal impairment unit 202 where it is collimated, filtered and focused 203 onto the APD. If the signal impairment unit 202 is a variable attenuator followed by an optical amplifier, the setup measures the transmission performance of the data pulsetrain under various optical signal-to-noise ratios (OSNR). As shown in FIG. 2B, for a given average pulse power the TPA counts per second (count rate) is a direct measurement of the OSNR—the lower the noise level the higher the TPA count or OSNR. Thus, data pulses received at a 23 dB OSNR level (lower noise level) generates more TPA counts than at 15 dB OSNR or pure amplifier spontaneous emission noise (ASE). The results of FIG. 2B show a strong correlation between the APD count (TPA counts/sec) and OSNR levels.

Figure 2C:
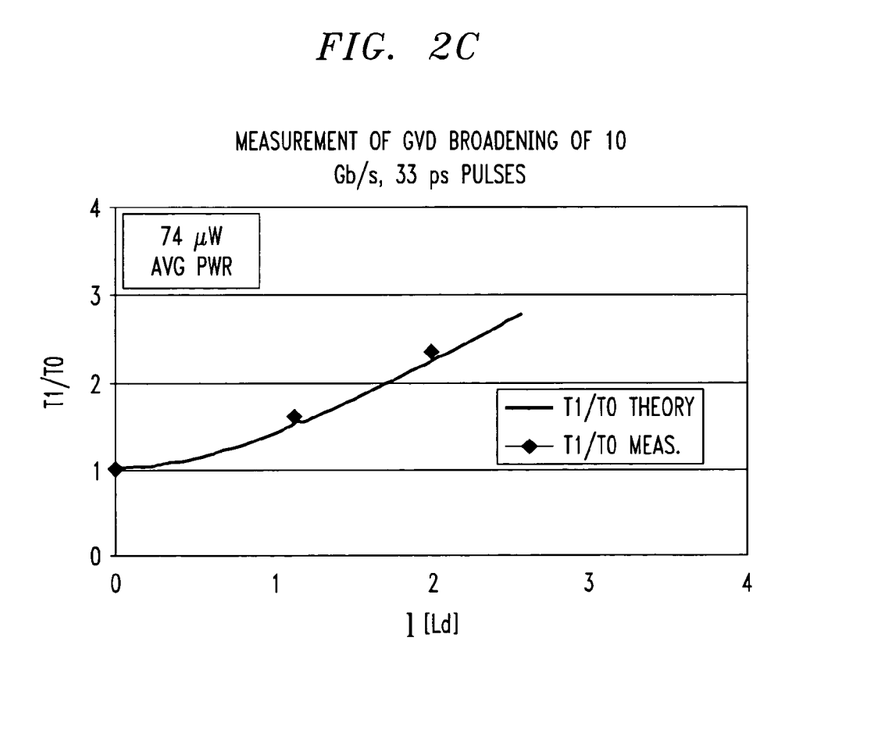
FIG. 2C shows APD apparatus for the measurement of the broadening of data pulse width due to group velocity dispersion (GVD).

In FIG. 2A, if the signal impairment unit 202 is apparatus (e.g., a variable length of optical fiber) exhibiting group velocity dispersion (GVD), the setup can be used to measure the broadening of data pulse width due to GVD as shown in FIG. 2C. In FIG. 2C, $T_1/T_0$ is the ratio of the output pulse width to that of the input. The horizontal axis is the length of the optical fiber measured in unit of the dispersion length of the fiber, $Ld = T_0^2/b_2$, where $b_2$ is the magnitude of the dispersion of the optical fiber used. As shown in FIG. 2C, GVD directly affects the pulsewidth and consequently the TPA count. Thus, the TPA count serves as a good measure of the deterioration of pulsewidth caused by GVD.

Figure 3A:
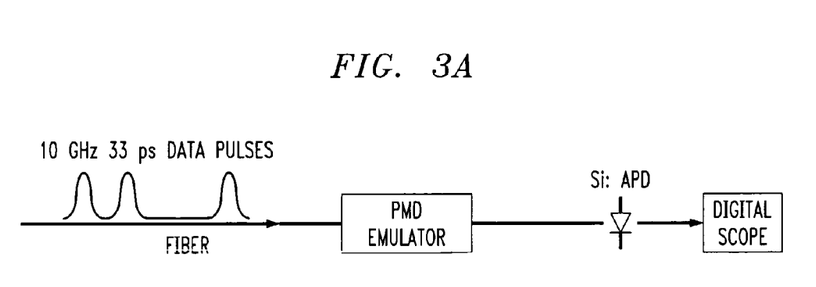
FIG. 3A shows an APD apparatus for the measurement of pulse mode dispersion (PMD) of the data pulses.
Figure 3B:
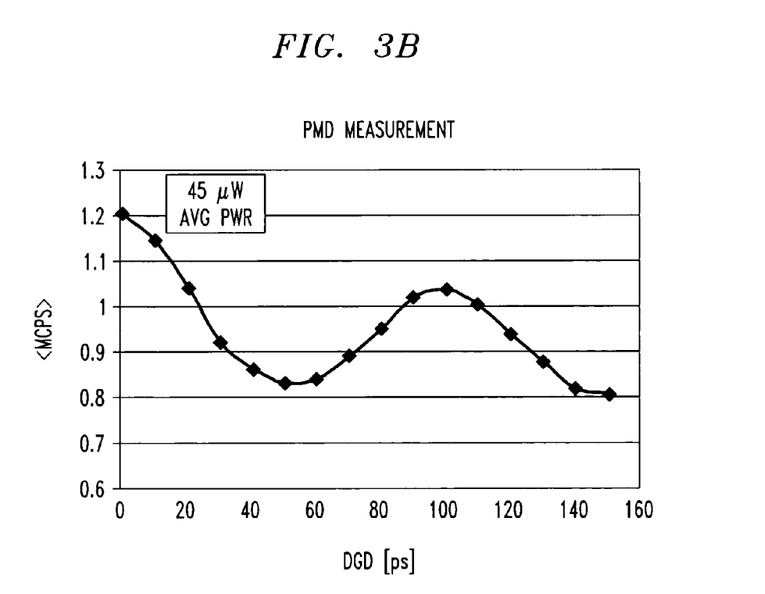
FIG. 3B shows the variation in TPA count rates due to the broadening of data pulse width due to PMD.

FIG. 3A shows an APD arrangement for the measurement of polarization mode dispersion (PMD) of the data pulses. FIG. 3A includes a PMD emulator for producing PMD impairment in the data pulse stream. In the FIG. 3B graph, the variation in APD (i.e., TPA) counts (in million counts per second—MCPS) is shown as a function of the differential group delay (DGD). The DGD is a measure of the broadening of pulsewidth due to PMD. The PMD causes different polarization of the data pulse to have different delays, and hence introduces pulse spreading and pulse distortion. As shown in FIG. 3B, as DGD increases the pulsewidth increases and hence the APD count decreases until the pulses of the two different polarization start to cause overlap of adjacent pulses (at about 50 ps DGD). Note since our example uses a 10 GB/s 33 ps data pulse stream, the separation between adjacent data pulses is 100 ps. Thus, there is only about 67 ps between the 3 dB level pulse width of adjacent pulses. As a result at 50 ps, the adjacent pulses are already starting to overlap. Since pulse overlap increases the likelihood of getting two-photon absorption (TPA) increases and hence the APD count increases with increasing pulse overlap. As shown in FIG. 3B, APD count increases when DGD increases beyond 50 ps. Thus, FIG. 3B shows that PMD affects pulsewidth directly and that APD count is a good measure of the effect of PMD on pulsewidth.

Compensation of Impairments Affecting Pulsewidth

In accordance with the present invention, we describe arrangements for the dynamic compensation of impairments affecting pulsewidth. Briefly, these arrangements work by measuring the pulsewidth using the APD count. A control unit includes an algorithm that works in a real-time manner to continually monitor the APD count and to generate a feedback signal. The feedback signal generated by the control algorithm is used to control an impairment compensation device that corrects for the impairment to keep it at the desired level. We describe two embodiments of our invention for the compensation of GVD and compensation of PMD impairments.

GVD Compensation

Figure 4:
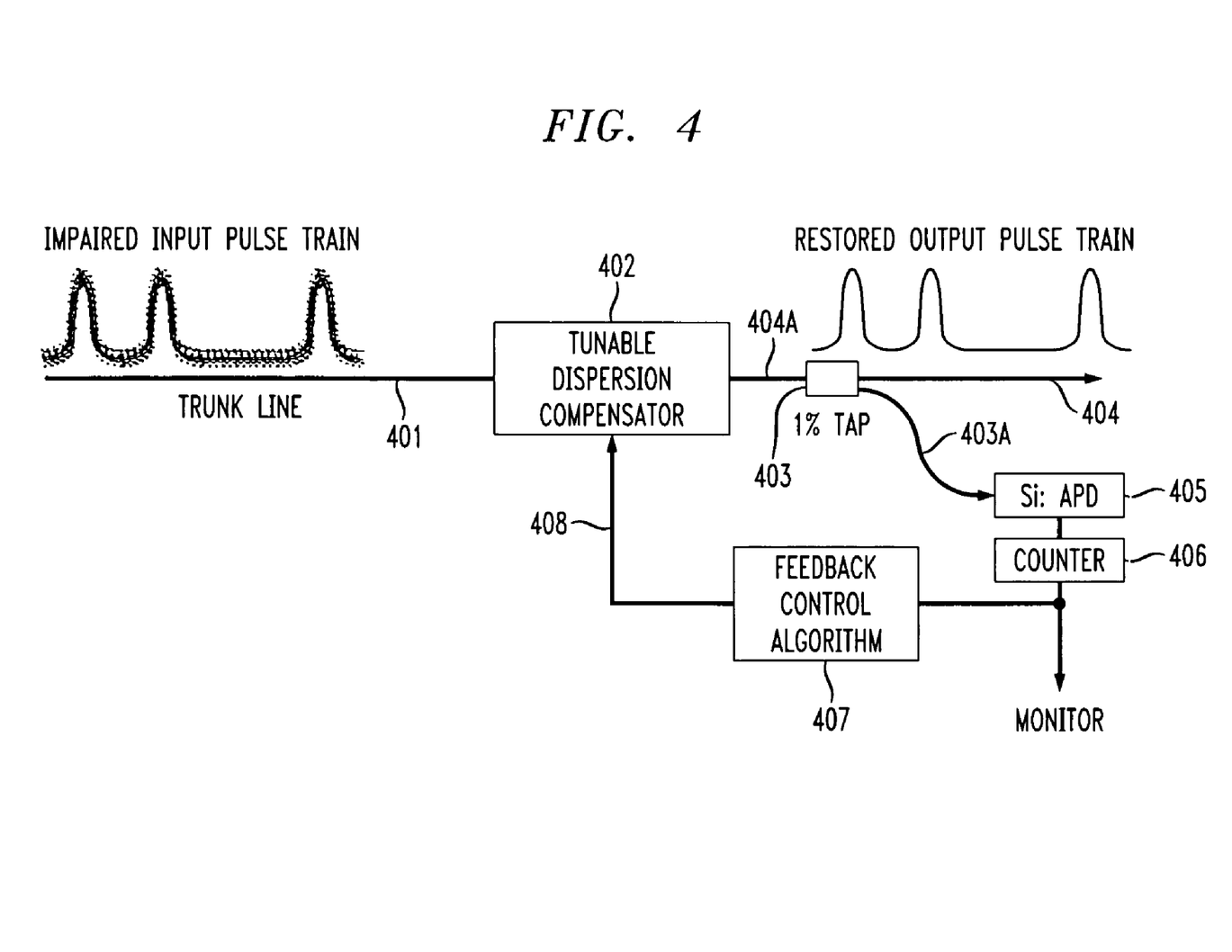
FIG. 4 shows apparatus for compensation of an optical signal for GVD impairment.

Shown in FIG. 4 is an implementation for a feedback system using the APD count to control GVD compensation. The impaired incoming data pulse train is received over an optical facility 401, such as an optical fiber. This data pulse train is sent through a tunable dispersion compensator (TDC), 402, that can apply variable amounts of net dispersion within, illustratively, ±500 ps/nm with only a single adjustment parameter [3]. A tap 403 (or signal-sampling device) obtains a small percentage of the light signal on output facility 404A, which exits TDC 402. The signal from tap 403 is sent to APD 405, which detects TPA in the signal, and counter 406 (or other apparatus capable of quantifying the TPA response), which counts the electrical pulses from APD 405 indicative of a TPA. The output of counter 406 may also be used to monitor GVD levels. The high TPA sensitivity and gain of APD 405 enables only a small amount of the power to be tapped (by tap 403) from the output light signal that exits on output facility 404. Note that the connection 404A between TDC 402 and tap 404 uses an optical fiber and that APD 405 is selected to be optical fiber compatible—so the connection 403A from tap 404 to APD 405 also uses an optical fiber. The use of optical fiber connections 403A and 404A eliminates the need for collimation/filtering/focusing as was provided by unit 203 of FIG. 2A.

The resulting TPA count from counter 406 is sent to control unit 407 where a feedback control algorithm is used to determine the level of undesired dispersive broadening (or narrowing) encountered by the received impaired pulse train on facility 401. The control unit 407 generates a control signal 408 that is used to control the amount of dispersion compensation that TDC 402 applies to the received impaired pulse train to correct for the undesired dispersion and thereby produce the restored pulse train. The feedback control algorithm in control unit 407 works at a rate that is fast enough (for example, 1 to 1000 Hz) to continually adjust the amount of dispersion compensation produced by TDC 402 to maintain the desired level of dispersion in the restored pulse train on facility 404.

In the above illustrative embodiment, the TDC 402 may be a tunable fiber Bragg grating, the tap 403 is a well known device, the APD 405 may be an EG&G SPCM-AQ Series or Perkin-Elmer SPCM Series APD, the counter 406 is a well known electrical pulse counter device, preferably with a threshold (discrimination level) adjustment. The control unit 407 utilizes a well known algorithm that compares the received TPA count to a predetermined TPA reference count level (which is associated with the desired dispersion level (or pulse width) of the restored output pulse train on facility 404). As result of this comparison, control unit 407 produces a control signal 408 that controls dispersion compensation parameter of TDC 402 to produce the predetermined TPA reference count level. The result is that the GVD level (or pulse width) of the restored output pulse train on facility 404 is controlled at the desired GVD level.

PMD Compensation

Figure 5:
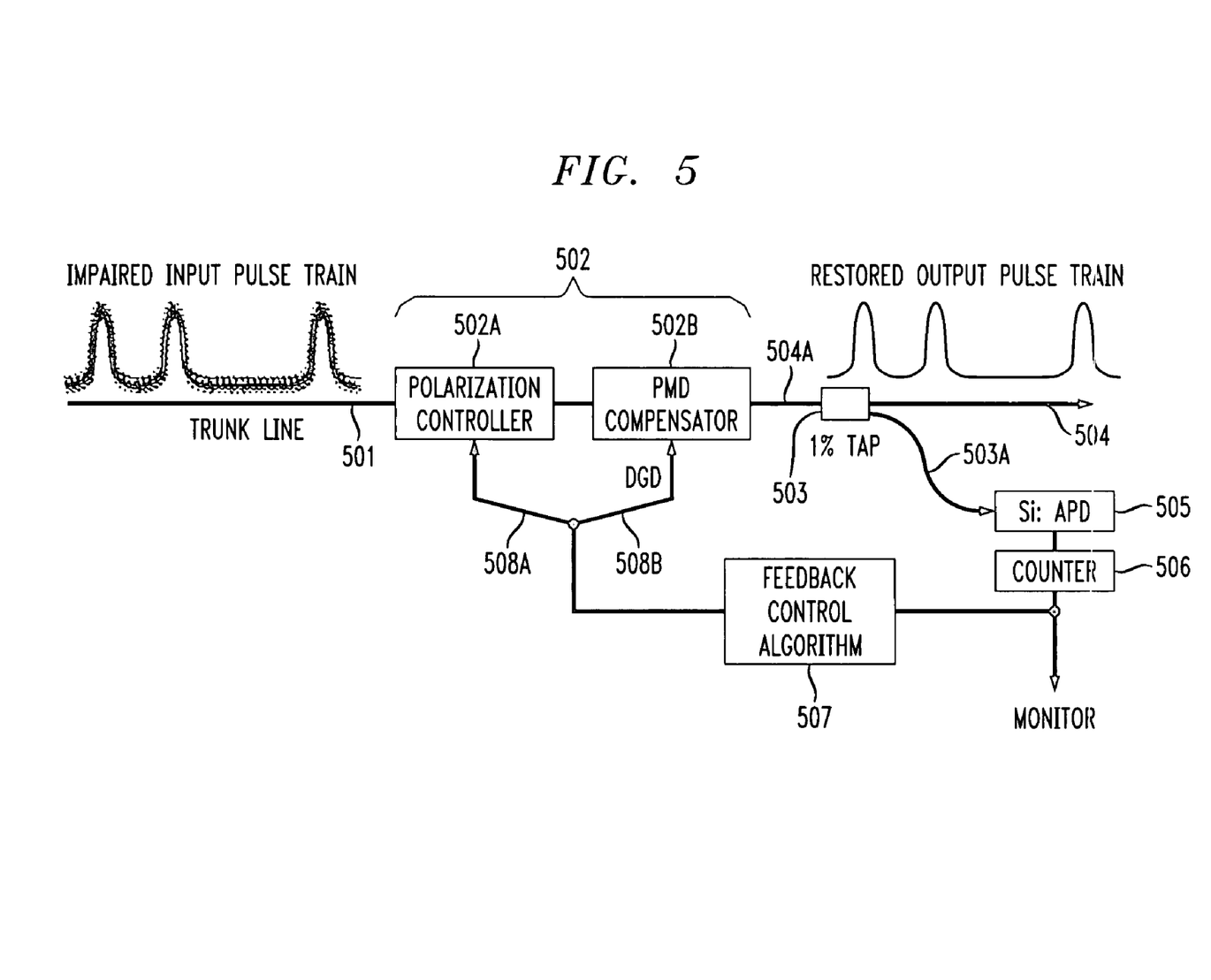
FIG. 5 shows apparatus for compensation of an optical signal for PMD impairment.

The disclosed system for PMD compensation of FIG. 5 differs from that of GVD compensation of FIG. 4 only in the compensation technique utilized. Thus, elements 501, 503, 503A, 504, 504A, 505, and 506 of FIG. 5 operate in the same manner as elements 401, 403, 403A, 404, 404A, 405, and 406 of FIG. 4. As shown in FIG. 5, unit 502 can be any kind of PMD compensator or emulator. For example, it may include a polarization controller 502A and a PMD compensator 502B. The impaired pulse train signal on facility 501 includes vertical and horizontal polarization components (not shown). The polarization controller 502A adjusts the polarization state of the signal that goes into the PMD compensator 502B. The PMD compensator 502B then applies a variable amount of differential group delay (DGD) to the received impaired pulse train signal. This setup allows for first order and some second order PMD compensation.

The control unit 507 utilizes a well known algorithm that compares the received TPA count to a predetermined TPA reference count level, associated with the desired PMD level of the restored output pulse train on facility 504. As result of this comparison, control unit 507 produces control signal 508A that controls polarization controller 502A and control signal 508B that controls DGD of PMD compensator 502B. The result is that the PMD level of the restored output pulse train on facility 504 is controlled at the desired PMD level. Note, the output of counter 506 may also be used to monitor PMD levels.

GVD and PMD Compensation

Figure 6:
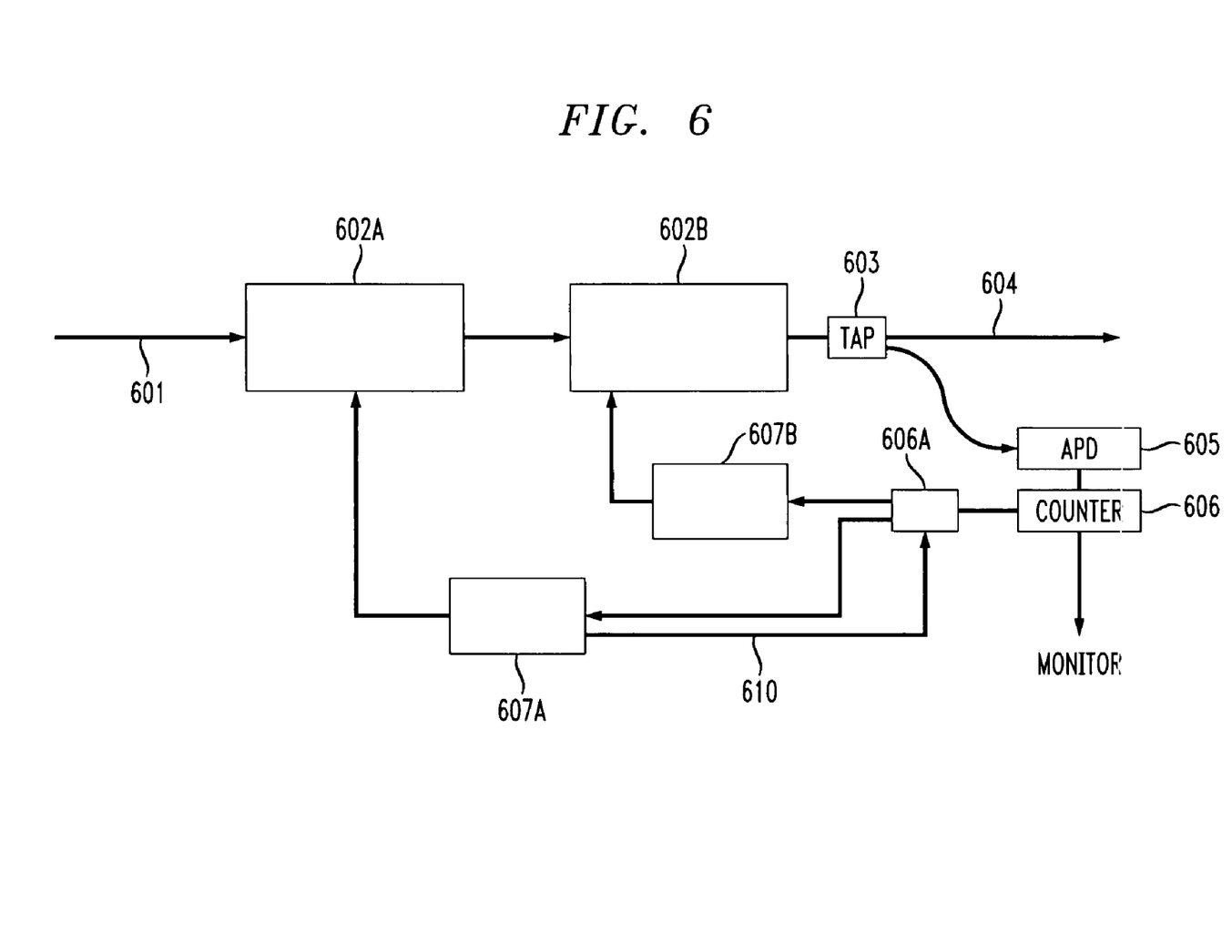
FIG. 6 shows apparatus for compensation of an optical signal for both GVD and PMD impairment.

Shown in FIG. 6 is signal compensation apparatus for providing both GVD and PMD compensation to an impaired input pulse train signal received over facility 601. As shown, a first compensation unit 602A connected in series with a second compensation unit 602B. The first compensation unit 602A may be a GVD compensation unit of FIG. 4 and the second compensation unit 602B may be a PMD compensation unit of FIG. 5 or vice-versa. The elements 601, 603, 605, and 606 of FIG. 6 operate in the same manner as the corresponding elements of FIG. 4. The operation of first compensation unit 602A and second compensation unit 602B do not operate at the same time, but rather, are alternately operated so that after first compensation unit 602A has made its dispersion improvement the second compensation unit 602B is operated and makes its PMD improvement. The above process is repeated until a predetermined level or maximum level of dispersion and PMD improvement has been reached.

For our example, assume that the first compensation unit 602A is the GVD compensator unit of FIG. 4 and the second compensation unit 602B is the PMD compensator unit of FIG. 5. Illustratively, the first compensation unit 602A is the master unit and controls switch unit 606A, using a control signal 610, to select which of the first compensation unit 602A or second compensation unit 602B should be operating at any particular time. (Note a separate control unit may be used to select when each unit is to operate.) If first compensation unit 602A is to operate, the TPA count signal from counter 606 is sent to control unit 607A only. Both control units 607A and 607B know that the existence of a TPA count signal from counter 606 is interpreted as a "start" signal and that an absence of a TPA count signal is to be interpreted as a "stop" signal. Again, as previously discussed, control unit 607A operates in the manner discussed in FIG. 4 and the control unit 607B operates in the manner discussed in FIG. 5. After control unit 607A has operated to obtain the best or predetermined reference level of GVD in the restored output signal, it sends a control signal to switch 606A which sends the TPA count signal to control unit 607B, thereby enabling control unit 607B and disabling control unit 607A. In this iterative manner, the operation of control units 607A and 607B are sequentially operated until the best level or predetermined level of distortion is reached in the restored output signal on facility 604. Note that the output of counter 606 may also be used to monitor GVD levels.

The apparatus described in FIGS. 2A, 4–6 may be incorporated as part of the transmitter, repeater(s) [or transceiver unit(s)], and receiver units of an optical network to measure OSNR, GVD, and PMD and to compensate for GVD, and PMD impairment to optical signals.

Coincident Pulse Detection

The present invention describes a novel TPA autocorrelation or crosscorrelation technique that uses a photon-counting silicon avalanche photodiode (APD) to achieve enhanced sensitivity over other TPA techniques. Note, autocorrelation is the correlation using two copies of the same pulse and cross correlation is the correlation between two different pulses. It is important to note that our technique differs uniquely from that reported in [2, 3] because unlike conventional APDs our APD device (EG&G, SPCM-AQ Series or Perkin-Elmer SPCM-AQR Series APD) is reverse biased above the breakdown voltage, and thus it operates like a bistable triggering circuit that can detect single photon events, and in this case single two-photon events, with extremely high gain and ultra-low background[4]. This highly efficient TPA process that occurs in the single photon counting APD, combined together with the lack of single-photon background events makes our method ideally suited to characterization of low average and peak power pulses.

Figure 7:
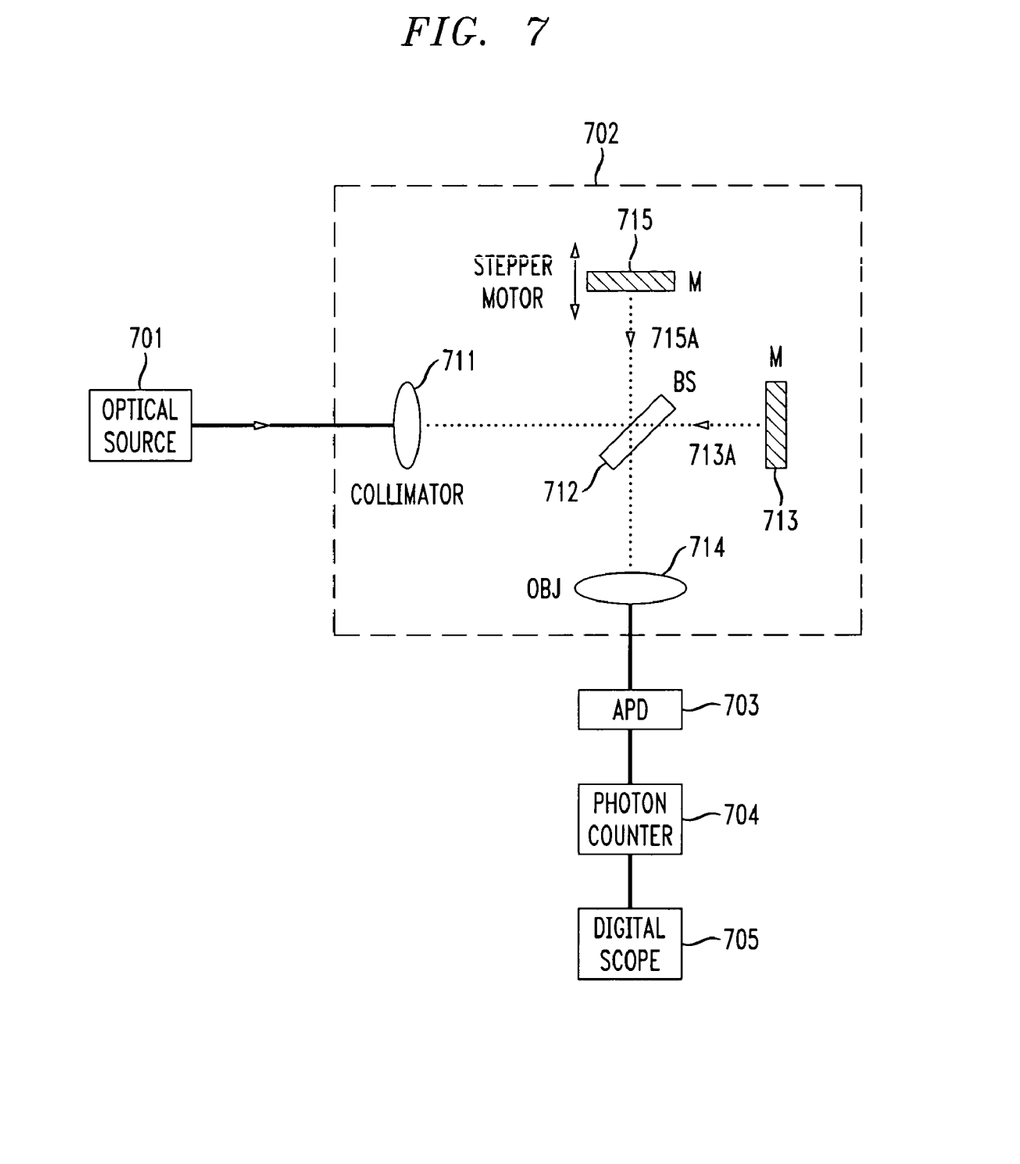
FIG. 7 shows APD apparatus for the measurement of autocorrelation of an optical signal.

With reference to FIG. 7 we describe APD apparatus for use in the measurement of autocorrelation of an optical signal. In our example, the optical source 701 is a 1575 nm continuous wave laser signal with a 10 GHz pulse rate and 1.67 ps pulsewidth. A Michelson-type autocorrelator 702 receives and collimates 711 the laser signal 701 after which the signal is split by beamsplitter into two components. One signal component is reflected by mirror 713 and the reflected signal 713A is reflected by beamsplitter 712 and focused by objective lens 714 onto APD 703. The other signal component is reflected by a moveable mirror 715 (controlled by a stepper motor) whose position is cyclically stepped between two end positions at a predetermined periodic rate. The reflected signal 715A from moveable mirror 715 then passes through beamsplitter 712, and is focused by objective lens 714 onto APD 703. Depending on its position the moveable mirror 715 introduces a differential signal delay of about 0±8 ps between signals 713A and 715A that cyclically varies at the predetermined rate.

The APD 703 detects TPA and outputs an electrical pulse which is counted by counter 704. A digital scope 705 (which is scanned at the same rate as the stepper motor that drives mirror 715) displays the TPA pulse count in the vertical direction and the differential delay in the horizontal direction.

Figure 8:
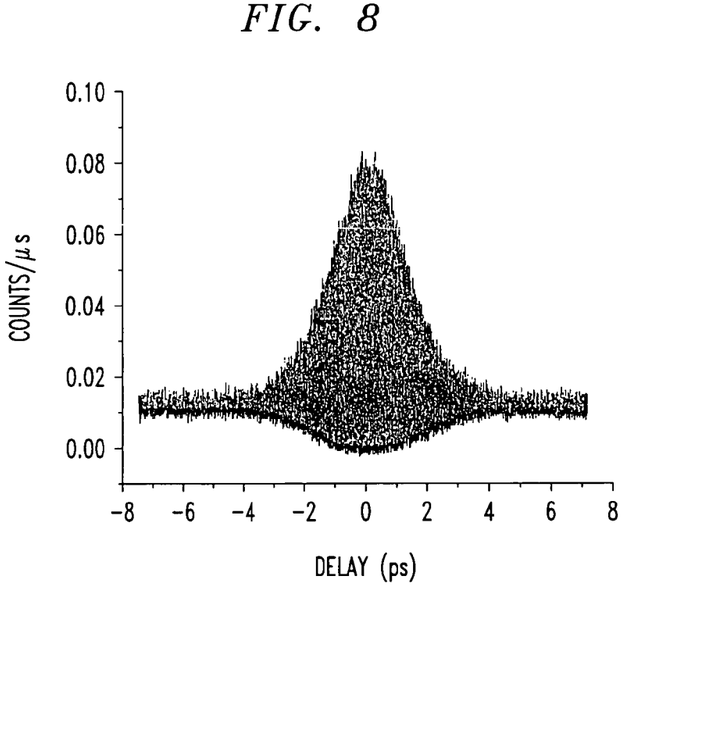
FIG. 8 shows a graph using an TPA count rate to determine the autocorrelation versus delay for a data pulse.

As shown in FIG. 8 the TPA count (in counts/µs) shows an autocorrelation characteristic as a function of differential delay between the two signals 713A and 715A. As shown, the TPA count peaks when the autocorrelation characteristic between the pulses of signals 713A and 715A peaks at zero differential delay.

As illustrated in FIG. 1, two-photon absorption (TPA) generated by single-mode CW laser dominates the signal output at average power levels above about 20 µW. A high signal to noise ratio autocorrelation trace of a 10 GHz repetition rate laser with 1.67 ps pulses can be obtained with only 7.2 µW of average power (220 µW peak power) incident onto the APD. This yields a ultra-sensitive autocorrelation measurement—measured peak power times average power sensitivity of $1.5 \times 10^{-3}$ $(mW)^2$.

Figure 9:
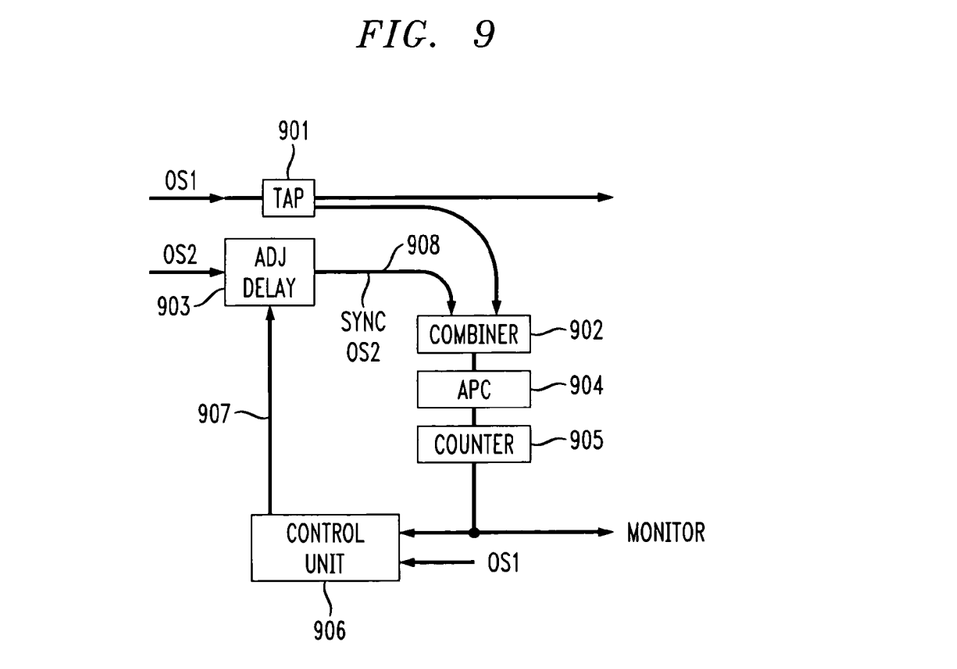
FIG. 9 shows APD apparatus for synchronizing of two optical data signals.

FIG. 9 shows an illustrative application of the APD apparatus of FIG. 7 to enable the synchronization of two optical data pulse streams OS1 and OS2. For example the apparatus of FIG. 7 may be located at a data receiver where it may be desired to synchronize signal a local clock signal (OS2) to a received data signal (OS1). A portion of the OS1 signal is split-off by tap 801 and applied to combiner 902. The OS2 signal passes through a variable delay circuit 903 and is applied to combiner 902. The combiner 902 combines the signals and applies them to APD 904. The operation of APD 904 and counter 905 is the same as described for the autocorrelator apparatus of FIG. 7, that is the TPA count is maximized when the modulation envelopes applied to the optical carrier of the OS1 and OS2 signals exhibit the same frequency and phase. Thus, when the OS1 and OS2 signals are coincident, i.e., when they are in synchronization, the TPA count is at a maximum. The TPA count is applied to control unit 906 which includes an algorithm which generates an adjust delay control signal 907 which controls the amount of delay that variable delay circuit 903 introduces to the OS2 signal. The algorithm adjusts the delay in variable delay circuit 903 so as to maximize the TPA count from counter 905. Since the data pulse OS1 is not always present, the algorithm in control unit 906 only considers the count during the presence of a data pulse OS1. When the delay in delay circuit 903 produces a maximum TPA count, the output clock signal (SYNC OS2, 908) from delay circuit 903 is in synchronism with data pulse OS1. The APD synchronization apparatus may be incorporated as part of the transmitter, repeater(s), and receiver units of an optical network to synchronize local clock signals to the received optical signals. The apparatus of FIG. 9 may also be used in other applications where the coincidence of two optical pulses needs to be determined.

While the above-description described our technique for two-photon absorption of a 1.2–2.0 µm optical signal using a silicon photon-counting avalanche photodiode, APD, it should be understood that the APD, more generally, may be used for detecting more than two-photons of an optical signal having an upper wavelength range greater than 2.0 µm. For example, the APD may be used for three-photon detection of an optical signal having an upper wavelength range to about 3.0 µm. Four-photon detection would extend the upper wavelength range of the optical signal beyond 3.0 µm, and so forth. It should be noted that for a given power level, the detected count rate by the APD decreases with the number of simultaneous photons being absorbed, thus the three-photon rate is typically less than the two-photon rate, etc.

REFERENCES

1. Chris Xu, Jeffrey M. Roth, Wayne H. Knox, Keren Bergman, "Ultra-sensitive autocorrelation of 1.5 µm light with single photon counting silicon avalanche photodiode;" *Electronics Letters*, Jan. 17, 2002, vol. 38, No. 2, pp. 86–88.
2. K. Kikuchi; Highly sensitive interferometric autocorrelator using Si avalanche photodiode as two-photon absorber; *Electronics Letters*, Jan. 8, 1998, vol. 34, No. 1, pp. 123–125.
3. K. Kikuchi; Optical sampling system at 1.5 µm using two photon absorption in Si avalanche; *Electronics Letters*, Jun. 25, 1998, vol. 34, No. 13, pp. 1354–1355.
4. S. Cova et al; Avalanche photodiodes and quenching circuits for single-photon detection; *Applied Optics*, Apr. 20, 1996, vol. 35, No. 12, pp. 1956–1976.

What is claimed is:

1. A method of determining a characteristic of an input optical signal, comprising the steps of:
   receiving the optical signal,
   applying the optical signal to a silicon photon-counting avalanche photodiode, APD, and detecting at least two-photon absorption, TPA, the optical signal having a wavelength range extending from 1.2 µm to an upper wavelength region that increases as the number of photons simultaneously absorbed by the APD increases beyond two, and
   wherein the characteristic of the optical signal being detected is a characteristic selected from a group including a signal-to-noise ratio, a group velocity dispersion, and a polarization mode dispersion.

2. A method of determining a characteristic of an input optical signal, comprising the steps of:
   receiving the optical signal,
   applying the optical signal to a silicon photon-counting avalanche photodiode, APD, and detecting at least two-photon absorption, TPA, the optical signal having a wavelength range extending from 1.2 µm to an upper wavelength region that increases as the number of photons simultaneously absorbed by the APD increases beyond two, and wherein the characteristic being detected is a pulse width of the optical signal and the detected TPA count is indicative of the narrowness of the optical signal.

3. Apparatus for detecting characteristics of an input optical signal comprising
a photon-counting avalanche Photo Diode, APD, for detecting at least two-photon absorption, TPA, of the optical signal, the optical signal having a wavelength range extending from 1.2 µm to an upper wavelength region that increases as the number of photons simultaneously absorbed by the APD increases beyond two, apparatus capable of quantifying the TPA response,
means for determining a characteristic of the optical signal using the detected TPA response,
wherein the characteristic being detected is a signal impairment of the optical signal and the detected TPA count is indicative of the signal impairment of the optical signal, and
wherein the optical signal is optical pulse communication signal and the signal impairment of the optical pulse communication signal being detected is selected from a group including a signal-to-noise ratio, a group velocity dispersion, and a polarization mode dispersion.

4. Apparatus for detecting characteristics of an input optical signal comprising
a photon-counting avalanche Photo Diode, APD, for detecting at least two-photon absorption, TPA, of the optical signal, the optical signal having a wavelength range extending from 1.2 µm to an upper wavelength region that increases as the number of photons simultaneously absorbed by the APD increases beyond two, apparatus capable of quantifying the TPA response,
means for determining a characteristic of the optical signal using the detected TPA response, and
wherein the optical signal is optical pulse communication signal and the characteristic being detected is a pulse width of the optical pulse communication signal and the TPA rate of the APD is indicative of the narrowness of the optical pulse communication signal.

5. Apparatus for detecting characteristics of an input optical signal comprising
a photon-counting avalanche Photo Diode, APD, for detecting at least two-photon absorption, TPA, of the optical signal, the optical signal having a wavelength range extending from 1.2 µm to an upper wavelength region that, increases as the number of photons simultaneously absorbed by the APD increases beyond two, apparatus capable of quantifying the TPA response,
means for determining a characteristic of the optical signal using the detected TPA response, and
wherein the detector apparatus is part of apparatus for real-time compensation of group velocity dispersion, GVD, and wherein the received optical signal is an optical pulse communication signal, the compensation apparatus further including
a tunable dispersion compensator for receiving the optical pulse communication signal, for providing a variable dispersion to the received optical pulse communication signal in response to a control signal, and for outputting a restored optical pulse communication signal;
a signal sampling device for sampling a predetermined portion of the restored optical pulse communication signal;
said detector apparatus detecting and counting the detected TPA rate of the restored optical pulse communication signal and for outputting a TPA count rate signal;
a control unit responsive to the TPA count rate signal for generating the control signal to the tunable dispersion compensator.

6. The GVD compensation apparatus of claim 5 being located at one or more communication units of an optical network including at a transmission unit, a repeater unit, and a receiver unit of the network.

7. Apparatus for detecting characteristics of an input optical signal comprising
a photon-counting avalanche Photo Diode, APD, for detecting at least two-photon absorption, TPA, of the optical signal, the optical signal having a wavelength range extending from 1.2 µm to an upper wavelength region that increases as the number of photons simultaneously absorbed by the APD increases beyond two, apparatus capable of quantifying the TPA response,
means for determining a characteristic of the optical signal using the detected TPA response, and
wherein the detector apparatus is part of apparatus for real-time compensation of polarization mode dispersion, PMD, and wherein the received optical signal is an optical pulse communication signal, the compensation apparatus further including
a PMD compensator for receiving the optical pulse communication signal, for providing a variable PMD compensation to the received optical pulse communication signal in response to a control signal, and for outputting a restored optical pulse communication signal;
a signal sampling device for sampling a predetermined portion of the restored optical pulse communication signal;
said detector apparatus detecting and counting the TPA rate of the restored optical pulse communication signal and for outputting a TPA count rate signal;
a control unit responsive to the count rate signal for generating the control signal to the PMD compensator.

8. The PMD compensation apparatus of claim 7 being located at one or more communication units of a network including at a transmission unit, a repeater unit, a transceiver unit, and a receiver unit of the network.

9. Apparatus for detecting characteristics of an input optical signal comprising
a photon-counting avalanche Photo Diode, APD, for detecting at least two-photon absorption, TPA, of the optical signal, the optical signal having a wavelength range extending from 1.2 µm to an upper wavelength region that increases as the number of photons simultaneously absorbed by the APD increases beyond two, apparatus capable of quantifying the TPA response,
means for determining a characteristic of the optical signal using the detected TPA response, and
wherein the detector apparatus is part of a signal compensation apparatus for real-time compensation of a received optical signal which is an optical pulse communication signal, the compensation apparatus further including
a first dispersion compensator for receiving a first optical pulse communication signal, for providing a variable dispersion to the received first optical pulse communication signal in response to a first control signal, and for outputting a second optical pulse communication signal;
a second dispersion compensator for receiving a second optical pulse communication signal, for providing a variable dispersion to the received second optical pulse communication signal in response to a second control signal, and for outputting a restored optical pulse communication signal;

a signal tap device for sampling a predetermined portion of the restored optical pulse communication signal;

said detector apparatus detecting and counting the TPA rate of the restored optical pulse communication signal and for outputting a TPA count rate signal;

a first control unit responsive to the TPA count rate signal for generating the first control signal to the first dispersion compensator during a first time interval;

a second control unit responsive to the TPA count rate signal for generating the second control signal to the second dispersion compensator during a second time interval;

wherein the first dispersion compensator is selected from a group including a polarization mode dispersion, PMD, compensator and group velocity dispersion, GVD, compensator; and wherein when the first dispersion compensator is selected to be the PMD compensator, the second dispersion compensator is selected to be the GVD compensator and vice-versa.

10. Apparatus for detecting characteristics of an input optical signal comprising a photon-counting avalanche Photo Diode, APD, for detecting at least two-photon absorption, TPA, of the optical signal, the optical signal having a wavelength range extending from 1.2 µm to an upper wavelength region that increases as the number of photons simultaneously absorbed by the APD increases beyond two, apparatus capable of quantifying the TPA response, means for determining a characteristic of the optical signal using the detected TPA response, and wherein the detector apparatus is part of an autocorrelation or cross correlation apparatus for determining the autocorrelation or cross correlation between two optical signals which are optical pulse signals, the autocorrelation apparatus further including means for producing a first and second optical pulse signals from the optical pulse communication signal, the second optical pulse signal having a controllable delay, relative to the first optical pulse signal, which is varied at a predetermined periodic rate;

said detector apparatus detecting and counting the detected TPA rate of the combined first and second optical pulse signals and for outputting a TPA count rate signal;

wherein said characteristic determining means is responsive to the TPA count rate signal for determining the autocorrelation between the first and second optical pulse signals as a function of the relative delay between the first and second optical pulse signals.

11. Apparatus for detecting characteristics of an input optical signal comprising a photon-counting avalanche Photo Diode, APD, for detecting at least two-photon absorption, TPA, of the optical signal, the optical signal having a wavelength range extending from 1.2 µm to an upper wavelength region that increases as the number of photons simultaneously absorbed by the APD increases beyond two, apparatus capable of quantifying the TPA response, means for determining a characteristic of the optical signal using the detected TPA response, and wherein the detector apparatus is part of apparatus for synchronizing a second optical pulse signal to a first optical pulse signal, the synchronizing apparatus further including input means for receiving the first optical pulse signal;

variable delay circuit responsive to an delay adjustment signal for delaying a received second optical pulse signal by an amount determined by the delay adjustment signal to generate a delayed second optical pulse signal;

combiner for combining the first and second optical pulse signals into a combined optical signal;

said detector apparatus detecting and counting the TPA rate of the combined optical signal and for outputting a TPA count rate signal;

wherein said characteristic determining means is responsive to the TPA count rate signal and the first optical pulse signal for generating a delay adjustment signal which when applied to the variable delay circuit results in a delayed second optical pulse signal which is in synchronization with the first optical pulse signal.

* * * * *